(12) United States Patent
Prichard (10) Patent No.: US 10,488,741 B2
(45) Date of Patent: Nov. 26, 2019

(54) SUPPORT APPARATUS

(71) Applicant: Anthony C. Prichard, Englewood, CO (US)

(72) Inventor: Anthony C. Prichard, Englewood, CO (US)

(*) Notice: Subject to any disclaimer, the term of this patent is extended or adjusted under 35 U.S.C. 154(b) by 0 days.

(21) Appl. No.: 15/967,600

(22) Filed: May 1, 2018

(65) Prior Publication Data

US 2018/0321573 A1    Nov. 8, 2018

Related U.S. Application Data

(60) Provisional application No. 62/492,952, filed on May 2, 2017.

(51) Int. Cl.
| | |
|---|---|
| *G03B 17/56* | (2006.01) |
| *F16M 13/02* | (2006.01) |
| *F16M 11/14* | (2006.01) |
| *F16M 11/20* | (2006.01) |
| *F16M 11/12* | (2006.01) |
| *F16M 11/28* | (2006.01) |
| *F16M 13/00* | (2006.01) |

(52) U.S. Cl.
CPC ......... *G03B 17/561* (2013.01); *F16M 11/123* (2013.01); *F16M 11/14* (2013.01); *F16M 11/2078* (2013.01); *F16M 11/2085* (2013.01); *F16M 11/28* (2013.01); *F16M 13/00* (2013.01); *F16M 13/022* (2013.01)

(58) Field of Classification Search
CPC ...... F16M 13/02; F16M 13/22; G03B 17/561; H04N 5/28
See application file for complete search history.

(56) References Cited

U.S. PATENT DOCUMENTS

| | | | |
|---|---|---|---|
| 8,602,662 B1* | 12/2013 | Mans ................... | F16M 11/041 248/160 |
| 2001/0034157 A1* | 10/2001 | DeLadurantaye, III ..................... | H01R 31/02 439/505 |
| 2009/0066846 A1* | 3/2009 | Castle .................... | H04N 5/222 348/722 |
| 2011/0205425 A1* | 8/2011 | Duncan ................ | F16M 11/041 348/373 |
| 2013/0193288 A1* | 8/2013 | Congdon ............... | F16M 11/14 248/231.41 |

(Continued)

*Primary Examiner* — Noam Reisner
(74) *Attorney, Agent, or Firm* — Roger A. Jackson (57) ABSTRACT

The present invention is a support apparatus and kit assembly for supporting an article capable of capturing human perceptible output, the support apparatus includes an extension beam having a proximal end portion and an opposing distal end portion with a longitudinal axis spanning therebetween, further included is an element for removably engaging the article and a first structure for a first selectively locking on a first omni-directionally movable position as between the distal end portion and the element, plus further included in the support apparatus is a second structure for a second selective locking a second omni-directionally movable position disposed at the proximal end portion. The kit assembly includes a light, a remote switch for the article, a remote microphone, an audio extension cord, a shotgun microphone, and a dual input audio input adaptor.

10 Claims, 7 Drawing Sheets

(56) References Cited

U.S. PATENT DOCUMENTS

| | | | |
|---|---|---|---|
| 2015/0224706 A1* | 8/2015 | Harkless | B29C 65/5092 |
| | | | 156/436 |
| 2015/0301559 A1* | 10/2015 | Wu | F16M 11/041 |
| | | | 248/229.16 |
| 2017/0277021 A1* | 9/2017 | Sultan | G03B 17/561 |

* cited by examiner

SUPPORT APPARATUS

RELATED PATENT APPLICATION

This application claims the benefit of U.S. provisional patent application Ser. No. 62/492,952 filed on May 2, 2017 by Anthony C. Prichard of Englewood, Colo., U.S.

FIELD OF THE INVENTION

The present invention generally relates to a support apparatus that suspends an article capable of capturing human perceptible output. More particularly, the present invention discloses that the support apparatus uses a selectively lockable omni-directional adjustment structure to allow variable positioning of the article for more optimal capturing of human perceptible output.

DESCRIPTION OF THE RELATED ART

There are a number selfie sticks available that accomplish the basic function of holding an article (typically a smart phone) a few feet away and facing the holder of the end of what is called the "selfie stick" that is opposite of the smart phone, adjustments are minimal and the typical selfie stick is good for self portraits and self video, however, that has poor audio due to the distance of the smart phone from the users voice-plus the low audio quality of the smart phone built microphone, probably the most common and best use for selfie sticks is for self fixed photo, i.e. such that no audio is required.

If a user wants to make a video, the options are difficult as a professional level video will cost thousands of dollars requiring the use of a studio, professional level camera and audio equipment, and then high level video editing-which can be a major part of the work effort and cost, with cutting and rearranging video segments, sequencing the audio, inserting voice overs, inserting animation, and so on to end up with a professional level video. This professional level video is fine for the appropriate situation, i.e. wherein a company or individual is established and financially capable of having a professional video made, in other words, a professional level video has its place.

However, what about the myriad of other situations, wherein the user has a need for a video and neither has the resources of specific need for a professional level video, but on the other hand needs an acceptable quality video with minimal cost, plus the acceptable quality video needs to be something better than an amateur appearing video, thus leaving a gap between professional quality video and amateur level video. So the first question is about the video and audio equipment required, but wait a minute good quality video and audio equipment will cost easily as much as a professional video, so that is not a viable route, but think about it, almost everyone already has a decent quality video camera in their pocket in their smart phone, however, the built-in tiny microphone really doesn't make acceptable audio (mostly due to subject distance and ambient noise), but there are low cost decent remote microphones available to take care of this issue, so what left is an economical way to substantially duplicate the benefits of a studio in steady video camera positions, microphone positions, and added lighting.

Thus the present invention has a focus upon utilizing a smart phone as a video camera and in the form of a kit assembly including a remote microphone, plus an enhanced selfie stick structure that facilitates multiple lockable positioning and attachment options for both the smart phone and a fixed support attachment object, thus freeing the user from manually holding the smart phone, which allows the user to concentrate on their video and audio routine thus enabling the user to create an acceptable video at an economical cost.

In looking at the prior art in the smart phone support apparatus arts, starting with United States Patent Application Publication Number 2015/0102074 to Elgan, disclosed is a handheld electronics case with integrated extension device that uses a telescoping rod assembly that also has an angle lock for the smart phone holder, wherein a case is added to closely fit the perimeter of the smart phone with the case having the ability to receive the telescoping rod assembly thus providing a stable support for the interface between the telescoping rod and the smart phone. Thus the novelty in Elgan is in the case for the smart phone, however, Elgan does not teach an omni-directional locking pivot nor a kit for making videos.

Further in the portable camera support apparatus arts in United States Patent Application Publication Number 2016/0195798 to Nenov, disclosed is a camera mount for self video recording that includes a user's torso harness with a spine pole extending upward over the user's head, with a pivot and a swivel on the spine pole such that a camera is mounted on the spine pole extension wherein an opposing extension on the spine pole can accommodate a second camera to have differing camera angles. Nenov is strictly a user mounted system utilizing a balanced pair of extensions to suspend the cameras overhead in relation to the user, so there is no teaching as to having independent support for the camera from a fixed object that doesn't require the user to support the camera suspension system.

Continuing, in the prior art in the smart phone support apparatus arts, in U.S. Patent Application Publication Number 2016/0252799 to LI, disclosed is a selfie device that includes a telescopic stick and a clamping device for the smart phone, wherein the clamping device is pivotally attached to the telescopic stick on one end plus there is a handle on the other end of the telescoping stick. LI again like Nenov does not teach anything other than a user manually supported camera mount, thus limiting the options available to the user for video posturing and freedom of movement.

Next, in the prior art in the smart phone support apparatus arts, in United States Patent Application Publication Number 2016/0381192 to Sherman et al., included is a multi-section rod that assembles lengthwise with an elastic member disposed therethrough the rod being similar to a portable tent stake, also included is a holder for the smart phone that is pivotally connected to the rod end. Sherman, like both LI and Nenov only teach the user manually hand-holding the support apparatus for the smart phone camera, again thus limiting the options available to the user for video posturing and freedom of movement.

What is needed is an invention that has a focus upon utilizing a common smart phone as a video camera and in the form of a kit including a remote microphone, plus an enhanced selfie telescoping stick structure that facilitates lockable multiple positioning and attachment options for both the smart phone and a fixed attachment structure, thus freeing the user from manually holding the smart phone, also allowing the user to concentrate on their video and audio routine which helps enable the user to create an acceptable video at an economical cost.

SUMMARY OF INVENTION

Broadly, the present invention is a support apparatus for supporting an article capable of capturing human perceptible output, the support apparatus includes an extension beam having a proximal end portion and an opposing distal end portion with a longitudinal axis spanning therebetween, further included is an element for removably engaging the article and a first means for a first selectively locking on a first omni-directionally movable position as between the distal end portion and the element, plus further included in the support apparatus is a second means for a second selective locking a second omni-directionally movable position disposed at the proximal end portion.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 3 shows cross section cut 3-3 from FIG. 2, wherein FIG. 3 shows in detail the primary clamp face, the elastomeric surface, apertures, and a flexible tie attaching the elastomeric surface to the primary clamp face;

FIG. 7 shows view 7-7 from FIG. 4, wherein

REFERENCE NUMBERS IN DRAWINGS

50 Support apparatus
55 Article
60 Human perceptible output as captured by the article 55
65 Fixed object
70 Extension beam
75 Proximal end portion of the extension beam 70
80 Distal end portion of the extension beam 70
85 Longitudinal axis of the extension beam 70
86 Element for removably engaging the article 55
90 First omni-directionally movable position
95 First means for a first selectively locking of the first omni-directionally movable position 90
100 Second omni-directionally movable position
105 Second means for a second selectively locking of the second omni-directionally movable position 100
110 Third means for the second means 105 to be removably engagable to the fixed object 65
115 C clamp type structure of the element 86
120 First finger of the C clamp type structure 115
125 Second finger of the C clamp type structure 115
130 Leg of the C clamp type structure 115
135 First bias of the C clamp type structure 115
140 First default state of the C clamp type structure 115
145 First 120 and second 125 fingers are removably engagable to the article 55
150 First selectively lockable pivotal attachment
151 First pivotal axis
155 First pivotal movement about the first pivotal axis 151
160 First selectively lockable swivel attachment
165 First swivel movement about the longitudinal axis 85
170 First selectively lockable ball in socket structure
175 First ball movement in ball socket structure 170
180 Second selectively lockable swivel attachment
185 Second swivel movement at swivel attachment 180 about the longitudinal axis 85
190 Second selectively lockable ball in socket structure
195 Second ball movement at ball socket structure 190
200 Clamp
205 Bias into a closed state of the clamp 200
210 Primary clamp 200 face
215 Secondary clamp 200 face
220 Second bias
225 Second default state
230 Elastomeric surface
235 First affixment
240 Recessed flexible tie
245 Apertures
250 Elongation of the primary clamp face 210
255 Interface of the elongation 250 and the second selectively lockable swivel attachment 180
260 Second affixment
265 Plurality of fasteners
270 Pattern of the plurality of fasteners 265
275 First moment of the interface 255
280 Selectable and lockable telescoping section
285 Variable extension beam 70 length along the longitudinal axis 85
290 Kit assembly for the support apparatus 50
295 Selectively lockable varying positional support between the fixed object 65 and the article 55
300 Remote microphone for the article 55
305 Extension cord for being disposed between the article 55 and the microphone 300
310 Gaffer tape
315 Shotgun microphone for the article 55
320 Dual audio input adaptor for multiple microphones 300 to feed the article 55
325 Remote switch for the article 55
330 Light for enhancing the article 55 capturing the human perceptible output 60
335 Gimbal bearing disposed between the element 86 and the first means 95

DETAILED DESCRIPTION

Figure 1:
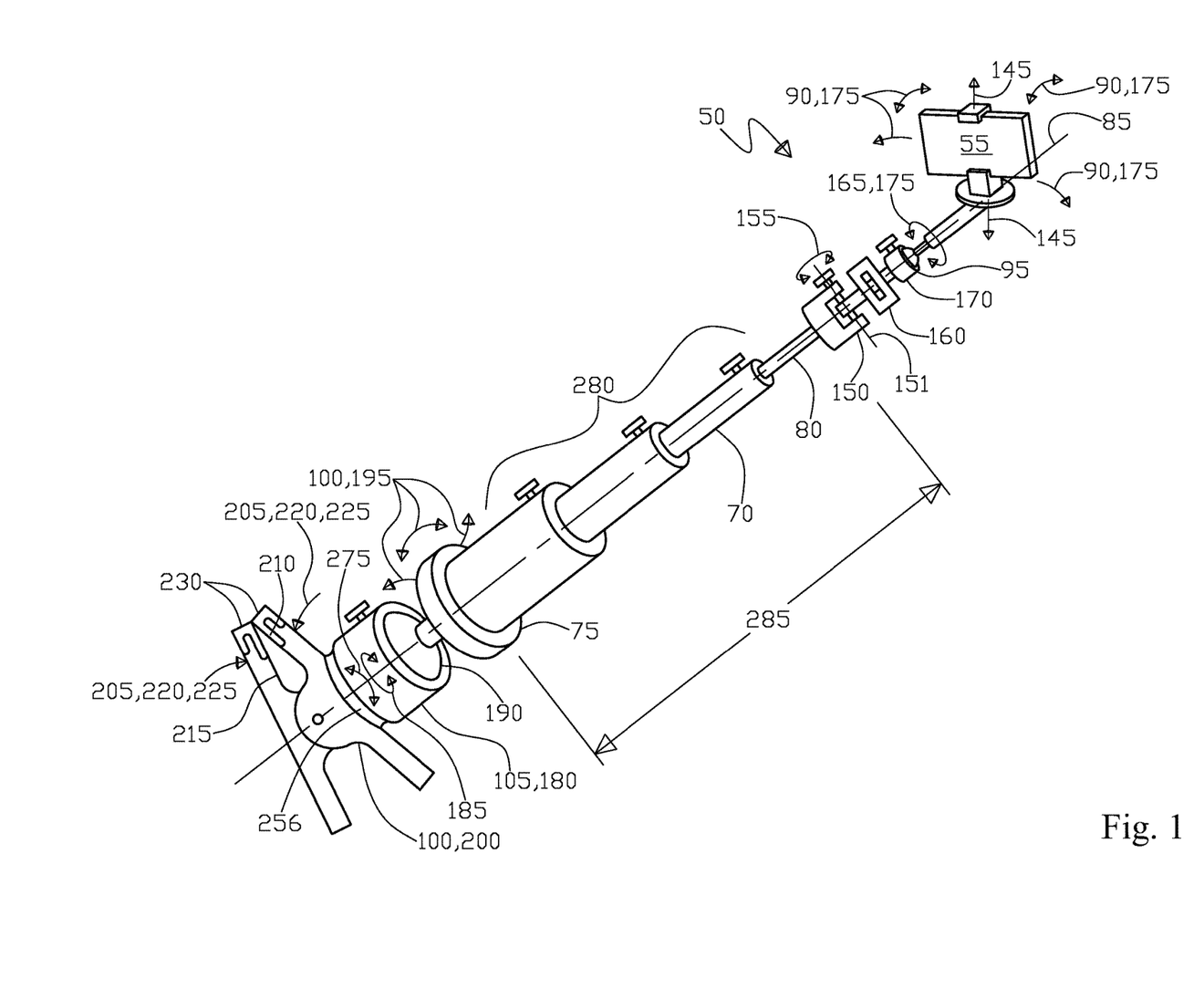
FIG. 1 shows an elevated perspective view of the support apparatus that includes an article, an extension beam having proximal and distal end portions with a longitudinal axis spanning therebetween, an element for engaging the article, a first means for a first selective locking of the article position, a second means for a second selective locking of a third means to be removably engagable to a fixed object, plus a telescoping section enabling a variable length for the extension beam.

With initial reference to FIG. 1, shown is an elevated perspective view of the support apparatus 50 that includes an article 55, an extension beam 70 having a proximal 75 and a distal 80 end portion with a longitudinal axis 85 spanning therebetween, an element 86 for engaging the article 55, a first means 95 for a first selective locking of the article 55 position, a second means 105 for a second selective locking of a third means 110 to be removably engagable to a fixed object 65, plus a telescoping section 280 enabling a variable length 285 for the extension beam 70.

Figure 2:
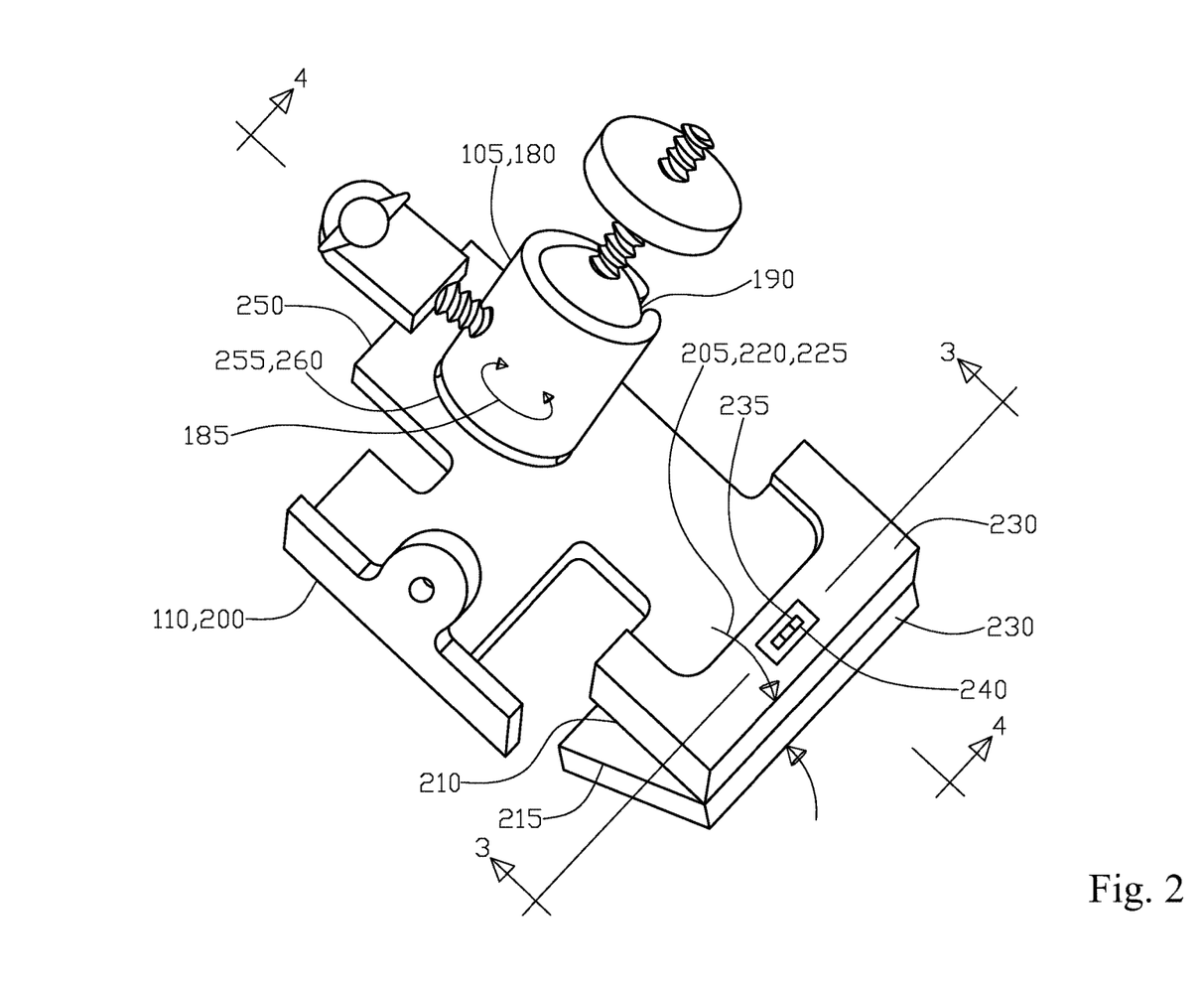
FIG. 2 is a close up perspective view of the second and third means that are respectively operational to enable a second selective locking of the third means to the fixed object, wherein shown is a clamp with a clamp bias, a primary and a secondary clamp face, an elastomeric surface, a first affixment, an elongation, and a second swivel attachment having a second ball in socket structure.

Next, FIG. 2 is a close up perspective view of the second 105 and third 110 means that are respectively operational to enable a second selective locking of the third means 110 to the fixed object 65, wherein shown is a clamp 200 with a clamp bias 205, a primary 210 and a secondary 215 clamp face, an elastomeric surface 230, a first affixment 235, an elongation 250, a second swivel attachment 180 having a second ball in socket structure 170.

Figure 3:
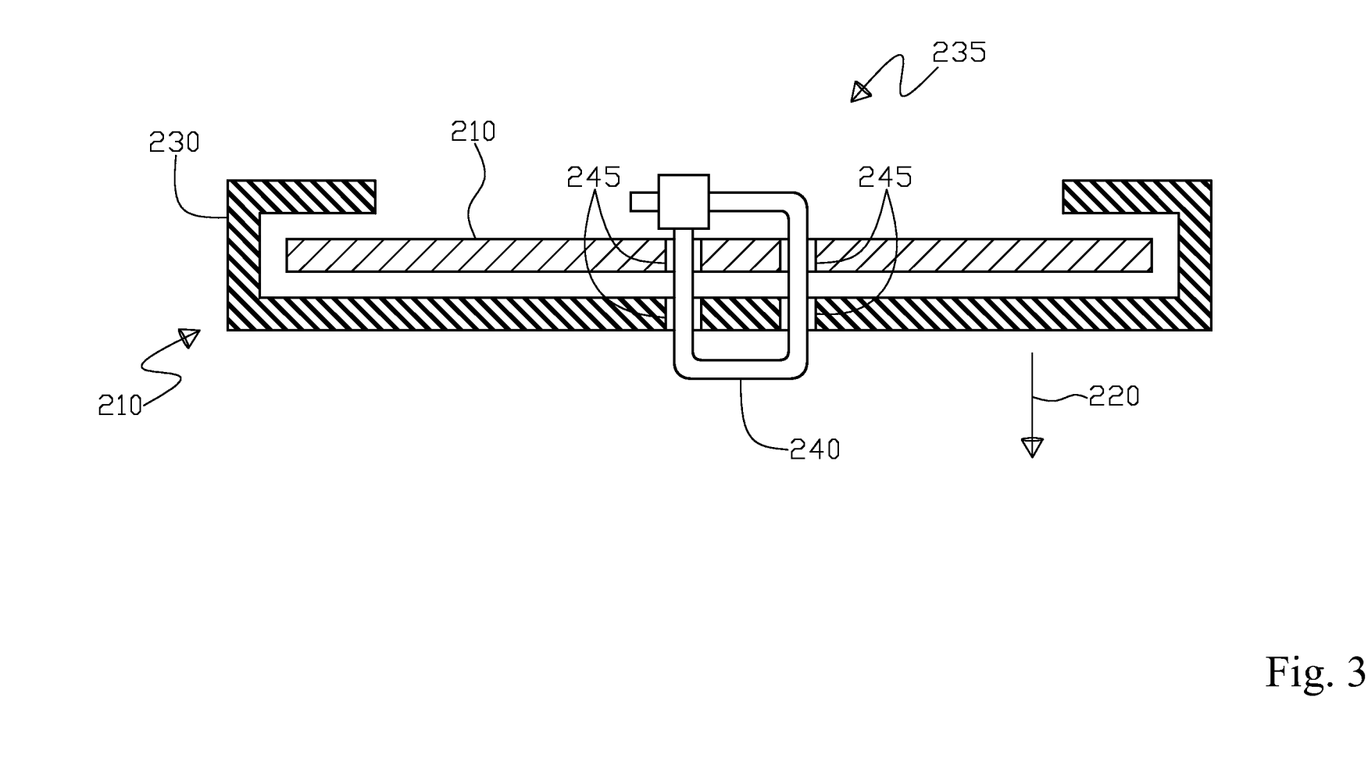

Continuing, FIG. 3 shows cross section cut 3-3 from FIG. 2, wherein FIG. 3 shows in detail the primary clamp face 210, the elastomeric surface 230, apertures 245, and a flexible tie 240 attaching the elastomeric surface 230 to the primary clamp face 210.

Figure 4:
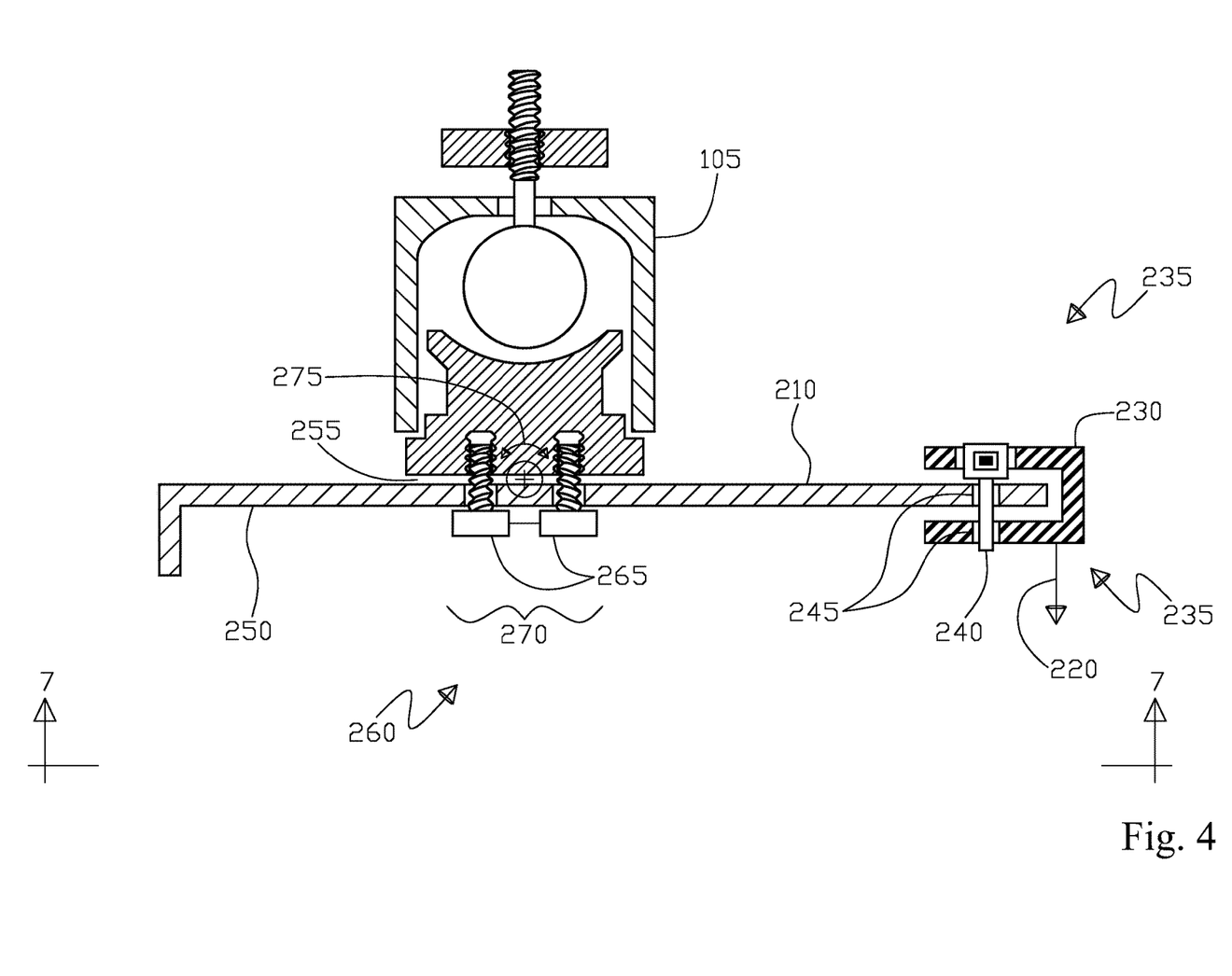
FIG. 4 shows cross section 4-4 from FIG. 2 that shows in detail the second ball in socket structure with a plurality of fasteners forming an interface between the elongation 250 and the second swivel attachment.

Further, FIG. 4 shows cross section 4-4 from FIG. 2 that shows in detail the second ball in socket structure 190 with a plurality of fasteners 265 forming an interface 255 between the elongation 250 and the second swivel attachment 180.

Figure 5:
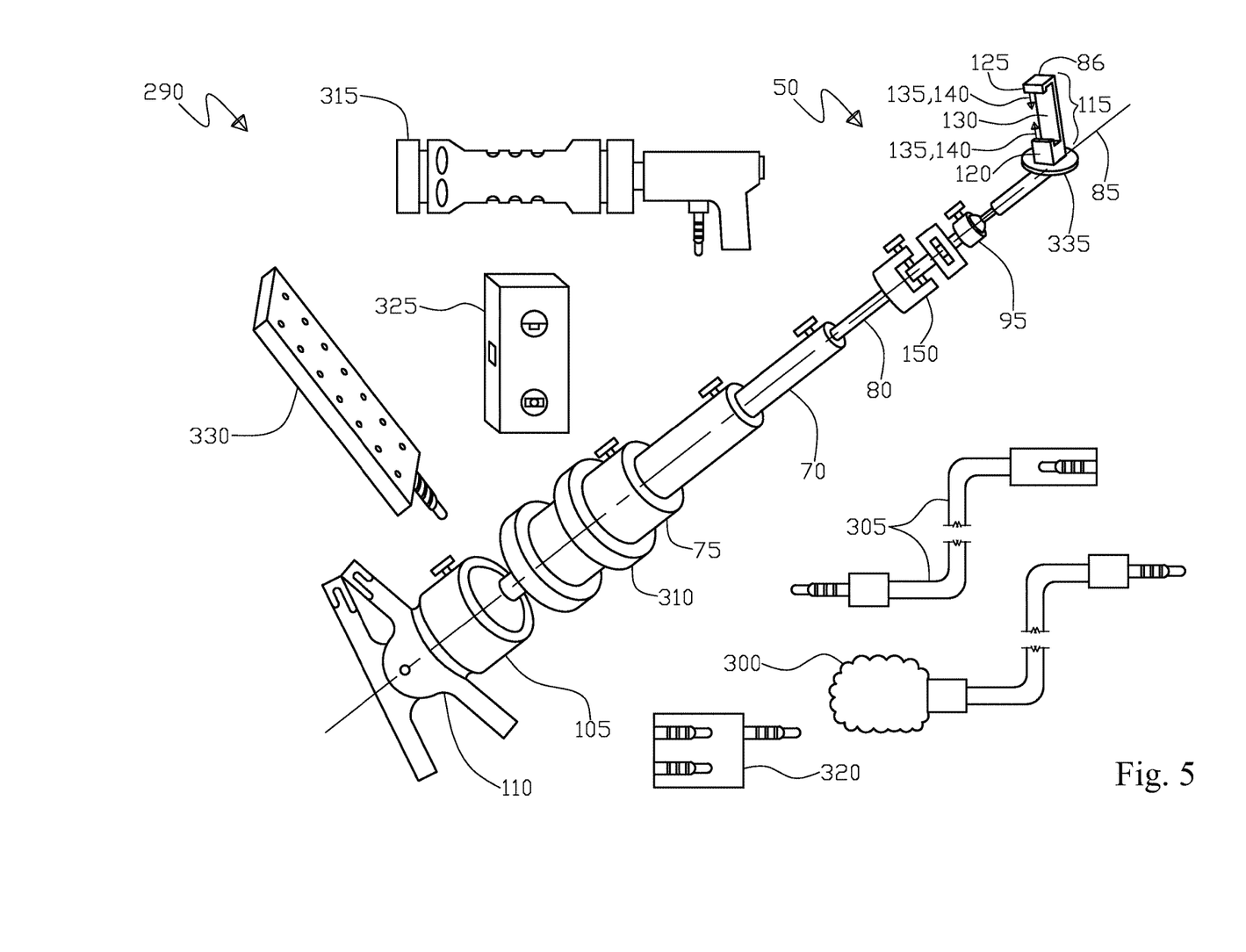
FIG. 5 shows a kit assembly of the present invention that includes the support apparatus, a light, a remote switch, a shotgun microphone, gaffer tape, a dual audio input adapter, a remote micro phone, and an extension cord for the remote microphone.

Yet further, FIG. 5 shows a kit assembly 290 of the present invention that includes the support apparatus 50, a light 330, a remote switch 325, a shotgun microphone 315, gaffer tape 310, a dual audio input adapter 320, a remote micro phone 300, and an extension cord 305 for the remote microphone 300.

Figure 6:
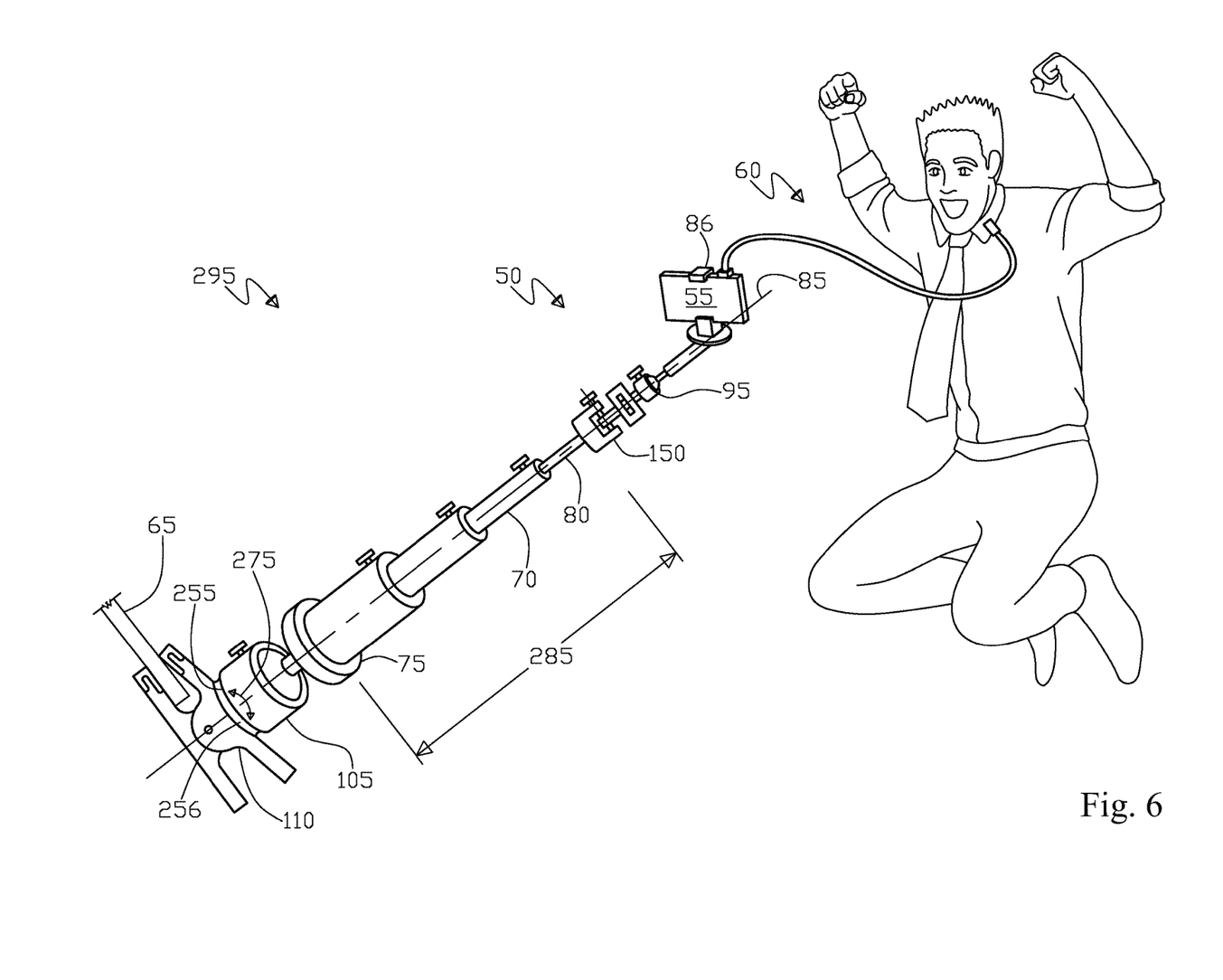
FIG. 6 shows a use perspective view of the support apparatus with the third means for removable engagement to the fixed object in the form of a clamp suspending the support apparatus that allows the human perceptible output to be free of having to suspend the support apparatus to facilitate a higher degree of freedom to use video to its maximum benefit.

Moving onward, FIG. 6 shows a use perspective view of the support apparatus 50 with the third means 110 for removable engagement to the fixed object 65 in the form of a clamp 200 suspending the support apparatus 50 that allows the human perceptible output 60 to be free of having to suspend the support apparatus 50 to facilitate a higher degree of freedom to use video to its maximum benefit.

Figure 7:
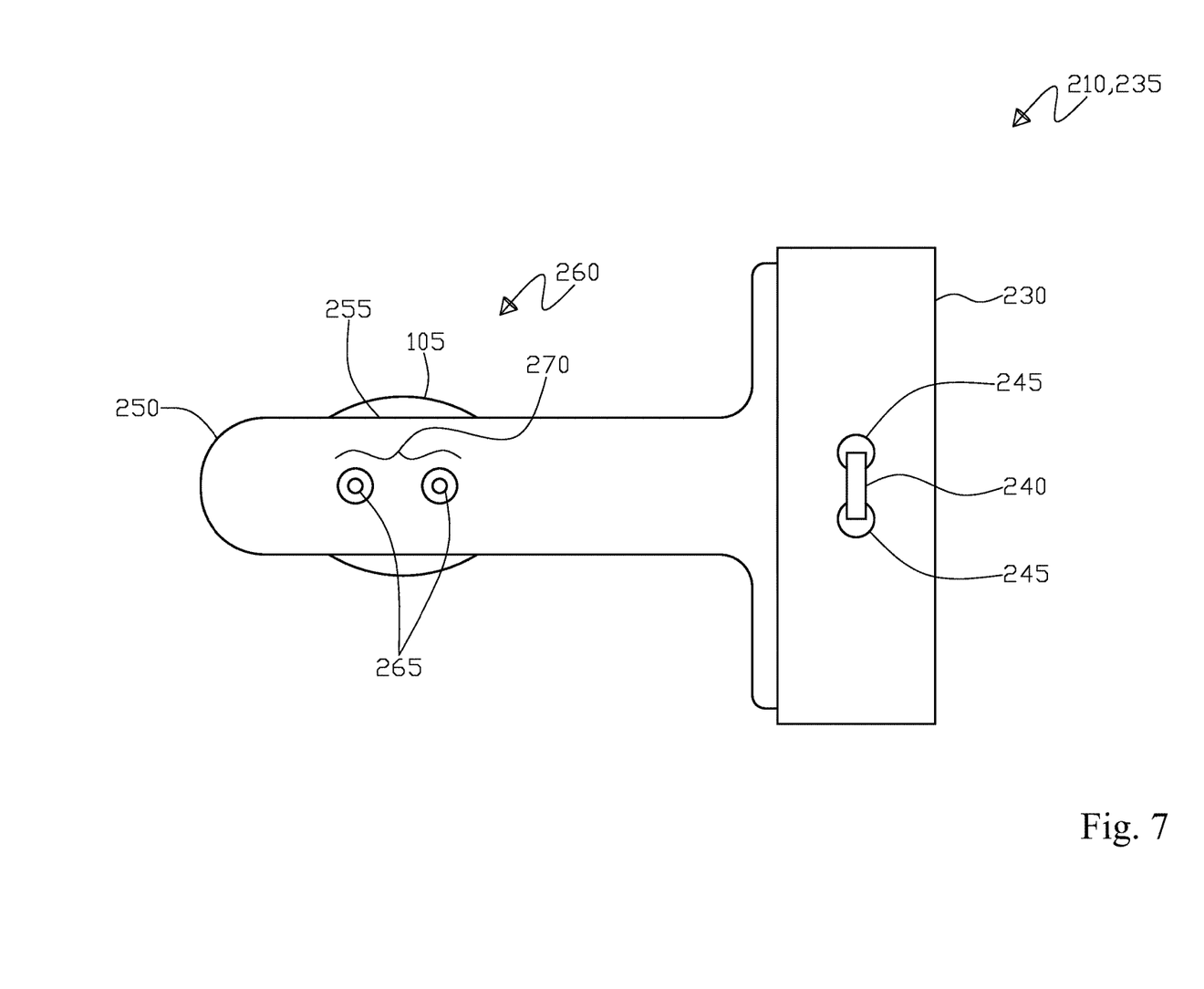
FIG. 7 shows in particular the plurality of fasteners that resist the first moment of the interface along with the elongation of the clamp plus the elastomeric surface, apertures, and recessed flexible tie of the primary clamp face.

Continuing, FIG. 7 shows view 7-7 from FIG. 4, wherein FIG. 7 shows in particular the plurality of fasteners 265 that resist the first moment 275 of the interface 255 along with the elongation 250 of the clamp 200 plus the elastomeric surface 230, apertures 245, and recessed flexible tie 240 of the primary clamp face 210.

Broadly, the present invention is the support apparatus 50 for supporting the article 55 capable of capturing human perceptible output 60, the support apparatus 50 includes the extension beam 70 having the proximal end portion 75 and the opposing distal end portion 80 with the longitudinal axis 85 spanning therebetween, see FIG. 1 in particular. Further included in the support apparatus 50 is an element 86 for removably engaging the article 55 and a first means 95 for a first selectively locking on a first omni-directionally movable position 90 as between the distal end portion 80 and the element 86, plus further included in the support apparatus 50 is a second means 105 for a second selective locking a second omni-directionally movable position 100 disposed at the proximal end portion 75, again see FIG. 1 in particular.

As an option for the support apparatus 50 it can further comprise the third means 110 for the second means 105 to be removably engagable to the fixed object 65 to ultimately support the article 55 from the object 65, see FIGS. 1 to 4 and FIGS. 6 and 7.

As another option for the support apparatus 50 wherein the element 86 is preferably constructed of a C clamp 115 type structure having a first finger 120 and a second finger 125 that are connected via a leg 130, wherein the first 120 and second 125 fingers are biased toward one another via a first bias 135 in a first default state 140, such that operationally the first 120 and second 125 fingers are removably engagable 145 to the article 55, see FIG. 5 in particular and also FIGS. 1 and 6.

Yet a further option for the support apparatus 50 is wherein the first means 95 is preferably constructed of a first selectively lockable pivotal attachment 150 having a first pivotal movement 155, that is in series with a first selectively lockable swivel attachment 160 having a first swivel movement 165, that is in series with a first selectively lockable ball in socket structure 170 having a first ball movement 175, see FIG. 1 in particular.

Alternatively, for the support apparatus 50 wherein the second means 105 is preferably constructed of a second selectively lockable swivel attachment 180 having a second swivel movement 185, that is in series with a second selectively lockable ball in socket structure 190 having a second ball movement 195, see FIG. 1 in particular and FIGS. 2 and 4 also.

Further alternatively for the support apparatus 50 wherein the third means 110 is preferably constructed of a clamp 200 that is biased 205 into a closed state via a second bias 220 that moves the primary clamp face 210 and the secondary clamp face 215 being toward one another in a second default state 225, see primarily FIGS. 1, 2, 5, and 6, plus secondarily FIGS. 3, 4, and 7.

Yet, another alternative, for the support apparatus 50 wherein the primary 210 and secondary 215 clamp faces each have the elastomeric surface 230 with a first affixment 235 to the respective primary 210 and secondary 215 clamp faces, see in particular FIGS. 3 and 4 plus also FIGS. 2 and 7.

Yet further another alternative for the support apparatus 50 wherein the first affixment 235 is preferably constructed of a recessed flexible tie 240 that is disposed therethrough the pair of apertures 245 in each of the primary 210 and secondary 215 clamp faces and each of their respective elastomeric surfaces 230, see in particular FIGS. 3 and 4 plus also FIGS. 2 and 7.

Continuing, a further alternative for the support apparatus 50 is wherein the primary clamp face 210 has the elongation 250 that has a second affixment 260 to the second selectively lockable swivel attachment 180 that is in series with the second selectively lockable ball in socket structure 190 of the second means 105, see FIGS. 2 and 4 in particular.

Other alternatives for the support apparatus 50 are wherein the second affixment 260 is preferably constructed of a plurality of fasteners 265 between the elongation 250 and the second selectively lockable swivel attachment 180, the plurality of fasteners 265 are in a pattern 270 to overcome the first moment 275 of the interface 255 of the elongation 250 and the second selectively lockable swivel attachment 180, see in particular FIGS. 4 and 7, plus also FIGS. 1 and 2.

Another alternative for the support apparatus 50 is wherein the extension beam 70 further comprises the selectable and lockable telescoping section 280 for selectively locking a variable extension beam length 285 along the longitudinal axis 85, as best shown in FIG. 1.

Additionally for the support apparatus 50 a kit assembly 290 is disclosed for the support apparatus 50 that provides the selectively lockable varying positional support 295 between the fixed object 65 and the article 55 capable of capturing human perceptible output 60, the support apparatus kit assembly 290 includes the support apparatus 50 as previously defined. Further the kit assembly 290 includes a remote microphone 300 for the article 55, an extension cord 305 disposed between the article 55 and the remote microphone 300, and gaffer tape 310 affixed to the support apparatus 50, see in particular FIG. 5.

As an option for the kit assembly 290 it can further comprise a shotgun microphone 315, a dual audio input adaptor 320 for the article 55, and a remote switch 325 for the article 55, again see in particular FIG. 5.

As another option for the kit assembly 290 for the support apparatus 50 it further comprise an independent light 330 to enhance the article 55 capturing the human perceptible output 60 and a Gimbal bearing 335 disposed between the element 86 and the first means 95, again see FIG. 5.

CONCLUSION

Accordingly, the present invention of the support apparatus has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A support apparatus for supporting an article capable of capturing human perceptible output, said support apparatus comprising:
   (a) an extension beam having a proximal end portion and an opposing distal end portion with a longitudinal axis spanning therebetween;
   (b) an element for removably engaging the article;
   (c) a first means for a first selectively locking on a first omni-directionally movable position as between said distal end portion and said element;
   (d) a second means for a second selective locking a second omni-directionally movable position disposed at said proximal end portion; and
   (e) a third means for said second means to be removably engagable to a fixed object to ultimately support the article from the fixed object, wherein said third means is constructed of a clamp that is biased into a closed state via a second bias that moves a primary clamp face and a secondary clamp face being toward one another in a second default state, said primary and secondary clamp faces each have an elastomeric surface with a first affixment to said respective primary and secondary clamp faces, said first affixment is constructed of a recessed flexible tie that is disposed therethrough a pair of apertures in each of said primary and secondary clamp faces and each of their respective elastomeric surfaces.

2. A support apparatus according to claim 1 wherein said element is constructed of a C clamp type structure having a first finger and a second finger that are connected via a leg, wherein said first and second fingers are biased toward one another via a first bias in a first default state, such that operationally said first and second fingers both removably engagable to the article.

3. A support apparatus according to claim 1 wherein said first means is constructed of a first selectively lockable pivotal attachment having a first pivotal movement, in series with a first selectively lockable swivel attachment having a first swivel movement, that is in series with a first selectively lockable ball in socket structure having a first ball movement.

4. A support apparatus according to claim 1 wherein said second means is constructed of a second selectively lockable swivel attachment having a second swivel movement, that is in series with a second selectively lockable ball in socket structure having a second ball movement.

5. A support apparatus according to claim 1 wherein said primary clamp face has an elongation that has a second affixment to a second selectively lockable swivel attachment that is in series with a second selectively lockable ball in socket structure of said second means.

6. A support apparatus according to claim 5 wherein said second affixment is constructed of a plurality of fasteners between said elongation and said second selectively lockable swivel attachment, said plurality of fasteners are in a positional attachment pattern to overcome and provide rigidity against a first moment of an interface of said elongation and said second selectively lockable swivel attachment, wherein said first moment has movement that is positioned substantially perpendicular to said extension beam longitudinal axis.

7. A support apparatus according to claim 1 wherein said extension beam further comprises a selectable and lockable telescoping section for selectively locking a variable extension beam length along said longitudinal axis.

8. A kit assembly for a support apparatus that provides selectively lockable varying positional support between a fixed object and an article capable of capturing human perceptible output, said support apparatus kit assembly comprising:
   (a) a support apparatus that includes an extension beam having a proximal end portion and an opposing distal end portion with a longitudinal axis spanning therebetween, further an element for removably engaging the article, in addition to a first means for a first selectively locking on a first omni-directionally movable position as between said distal end portion and said element, and a second means for a second selective locking a second omni-directionally movable position disposed at said proximal end portion, plus a third means for said second means to be removably engagable to a fixed object to ultimately support the article from the object, wherein said third means is constructed of a clamp that is biased into a closed state via a second bias that moves a primary clamp face and a secondary clamp face being toward one another in a second default state, said primary and secondary clamp faces each have an elastomeric surface with a first affixment to said respective primary and secondary clamp faces, said first affixment is constructed of a recessed flexible tie that is disposed therethrough a pair of apertures in each of said primary and secondary clamp faces and each of their respective elastomeric surfaces;
   (b) a remote microphone for the article;
   (c) an extension cord disposed between the article and the remote microphone; and
   (d) gaffer tape affixed to said support apparatus.

9. A kit assembly for a support apparatus according to claim 8 further comprising a shotgun microphone, a dual audio input adaptor for the article, and a remote switch for the article.

10. A kit assembly for a support apparatus according to claim 9 further comprising an independent light to enhance the article capturing the human perceptible output and a Gimbal bearing disposed between said element and said first means.

\* \* \* \* \*